United States Patent [19]

Arnaud et al.

[11] Patent Number: 5,412,268
[45] Date of Patent: May 2, 1995

[54] ELECTRICAL TRACTION SYSTEM INTEGRATING THE MOTOR AND BRAKE GENERATOR FUNCTION WITH THE CHARGER AND/OR CONVERTER FUNCTION

[75] Inventors: Georges Arnaud, Orsay; Claude Jacques, Chevreuse, both of France

[73] Assignee: Auxilec, Chatou, France

[21] Appl. No.: 961,373

[22] Filed: Oct. 15, 1992

[30] Foreign Application Priority Data

Oct. 23, 1991 [FR] France .................. 91 13126

[51] Int. Cl.⁶ ............ H02K 11/00; H02K 7/00; H02P 3/14; H02P 3/18
[52] U.S. Cl. ............ 310/67 R; 318/139; 318/376; 310/68 R
[58] Field of Search ............ 310/67 R, 68 R, 180; 320/61, 62; 322/1; 318/139, 140, 142, 151, 152, 153, 376; 363/109, 124, 131, 132, 135, 136, 175

[56] References Cited

U.S. PATENT DOCUMENTS

| | | | |
|---|---|---|---|
| 1,971,730 | 8/1934 | Proctor | 363/109 |
| 3,818,316 | 6/1974 | Carlson | 322/1 |
| 4,010,407 | 3/1977 | Lombard | 318/139 |
| 4,091,319 | 5/1978 | Nguyen | 318/139 |
| 4,124,812 | 11/1978 | Naito et al. | 318/376 |
| 4,127,803 | 11/1978 | Etienne | 318/139 |
| 4,348,619 | 9/1982 | Ray et al. | 318/139 |
| 4,409,525 | 10/1983 | Hartwig | 318/139 |
| 4,825,139 | 4/1989 | Hamelin et al. | 320/61 |
| 5,099,186 | 3/1992 | Ripple et al. | 318/376 |
| 5,182,508 | 1/1993 | Schauder | 318/139 |

FOREIGN PATENT DOCUMENTS

| | | |
|---|---|---|
| 0138000 | 5/1985 | European Pat. Off. . |
| 2592342 | 7/1987 | France . |
| 3132129 | 3/1982 | Germany . |
| 2235836 | 3/1991 | United Kingdom . |

OTHER PUBLICATIONS

Patent Abstract of Japan, vol. 7, No. 250 (M–254), Nov. 8, 1983.
Patent Abstract of Japan, vol. 8, No. 166 (M–314) Aug. 2, 1984.

Primary Examiner—Thomas M. Dougherty
Assistant Examiner—C. LaBalle
Attorney, Agent, or Firm—Roland Plottel

[57] ABSTRACT

An electrical traction system notably for automobiles which has (a) at least one recharging supply source; (b) at least one synchronous electrical motor with a stator having a plurality of spatially offset stator windings, a commutating device with choppers for routing a current given by the supply source into the stator winding in order to create a rotating magnetic field, and a rotor; (c) a circuit for charging the supply source including a transformer, which transformer includes the stator windings; and (d) at least one converter for charging an auxiliary battery.

13 Claims, 6 Drawing Sheets

5,412,268

ELECTRICAL TRACTION SYSTEM INTEGRATING THE MOTOR AND BRAKE GENERATOR FUNCTION WITH THE CHARGER AND/OR CONVERTER FUNCTION

BACKGROUND OF THE INVENTION

1. Field of the Invention

The present invention relates to an electrical traction system for automobiles that is a multifunction system integrating the main motor and brake generator function with the auxiliary charger and converter functions.

2. Description of the Related Art

In the field of the technology of electrical traction systems for automobiles, there is the major problem of reducing the quantity and cost price of the raw material used as well as the number of electronic components used for the controls.

The aim of the present invention therefore is to provide for an electrical traction system for automobiles that meets standard requirements more efficiently than do prior art traction systems of the same type, designed for the same purpose, notably inasmuch as this system is:
lighter,
less costly,
more efficient,
more reliable,
and at the same time meets regulatory standards and especially safety standards.

The solution to the technical problem referred to here above is defined by means for the switching over of the stator windings of the electrical motor of the electrical traction system that is an object of the present invention enabling the performance, as required, by these same windings, of not only their main motor/generator function but also the auxiliary charger and/or converter functions.

SUMMARY OF THE INVENTION

More specifically, an object of the present invention is a traction system for automobiles, such as cars, trucks, buses, scooters or mopeds, comprising:

at least one electrical generator, notably an electromechanical generator (constituted, in this case, by a thermal motor for the driving of a generator, especially an AC motor) and/or an electrochemical generator, constituted by at least one accumulator and/or at least one fuel cell;

at least one electrical motor that is reversible (namely a motor capable of working as a motor and brake generator and hence capable of carrying out the electrical traction in motor operation) said electrical machine being of the self-synchronous type, comprising:

a stator provided with at least one polyphase winding comprising a given number of stator windings (E1, E2, E3, E4; e1, e2, e3, e4) which correspond to the different phases and are spatially offset, and a device for sequential switching over from one phase to another enabling the generation of a shift in time, between the currents designed to flow in the different stator windings, said shift being necessary for the creation of a rotating stator magnetic field, and a coiled rotor, namely one comprising at least one rotor winding (E5, E6) designed to be crossed by a direct current for the creation of a magnetic flux defining the rotor field;

at least one charger carried in the system, said charger designed to recharge at least one main or auxiliary supply battery (Vp);

at least one converter of the high-voltage direct current, corresponding to said main or auxiliary battery (Vp), into a low-voltage direct current designed for the supply and recharging of a standard power-supply battery (Vs), the voltage of which is notably 6 V or 12 V, said electrical traction system being one wherein the means for the switching over of the stator windings (E1, E2, E3, E4) and of the main semiconductor components of the power electronic circuitry for the control of the auto-synchronous machine (said windings and said components being necessary for its basic or main operation as a motor and as a brake generator) provide for the reconfiguration of said windings and said components in at least one auxiliary mode of operation, corresponding notably to said charger and/or to said converter, thus enabling the reduction of the number of the windings and of the semiconductor components needed to carry out said auxiliary operation.

According to a first advantageous embodiment of the electrical traction system according to the invention:

the stator comprises star-connected first, second, third and fourth windings (E1, E2, E3, E4) that are spatially offset by 90/p mechanical degrees (2 p being the number of magnetic poles of the self-synchronous machine) and are connected two by two so as to define a first group and a second group of windings (E1, E2, E3, E4), of which the first group comprises said first and third stator windings (E2, E3) while the second group comprises said second and fourth windings (E2, E4) so that the windings (E1, E3) of said first group as well as the windings (E2, E4) of said second group are offset with respect to one another by 180 electrical degrees while the first and second windings (E1, E2) as well as the third and fourth windings (E3, E4) are offset with respect to one another by 90 electrical degrees;

the above-mentioned switch-over means comprise first, second, third and fourth choppers (a, A, b, B) that are mounted in series respectively with said first, second, third and fourth windings (E1, E2, E3, E4) and are controlled sequentially two by two (a, A; b, B) during switching, i.e. the switching over of the first and second choppers (a, A) is actuated, then the switching over of the third and second choppers (b, A) as well as that of the third and fourth choppers (b, B), and this is followed by the switching over of the first and fourth (a, B), to enable the sequential shunting or routing of the stator current (Ist) in the stator windings combined two by two, i.e. respectively in the first and second windings (E1, E2), the third and second windings (E3, E2), the third and fourth windings (E3, E4), as well as in the first and fourth windings (E1, E4), said second and fourth choppers being also controlled in modulation to set the value of said stator current.

According to a preferred arrangement of this embodiment, said first and third choppers (a, b) are mechanical, two-way switch-over means formed by means of a ring (B1) as well as a first half-ring and a second half-ring (B2, B3), the first half-ring (B2) being connected electrically to the ring (B1) while the second half-ring (B3) is electrically insulated from the ring (B1) as well as from the first half-ring (B2).

According to an advantageous modality of this arrangement, said ring (B1) and half-rings (B2, B3) are mounted on the rotor axis (x—x) of the self-synchronous machine and respectively slide on first, second and third fixed brushes (b1, b2, b3).

According to an advantageous variant of this modality, said ring (B1) and half-rings) are fixed and come into sliding contact with a double brush (bt) rotating about the rotor axis, within said ring (B1) and half-rings (B2, B3).

According to an alternative embodiment of said arrangement, said first and second choppers (a, b) are semiconductor-based two-way switching means and are controlled by the sensing of the angular position of the rotor with respect to the stator.

According to a second arrangement, each of said second and fourth choppers (A, B) is, in motor and brake generator mode of operation, a semiconductor-based two-way switching means.

According to an advantageous modality of this second arrangement, each of said second and fourth clippers (A, B) uses a diode (d) in motor operation mode, the control of the stator current (Ist) being achieved in this case by a control of the rotor current (Iro).

According to other advantageous arrangements in conformity with the invention:

in motor operation, said second and fourth choppers (A, B) are respectively protected by a first diode and a second diode, known as "free wheel"diodes (d1, d2) each connected in parallel with said first and second windings (E1, E2) and, respectively, said third and fourth windings (E3, E4);

in generator operation, the reversal of the direction of flow of the current in the stator windings (E1, E2, E3, E4), with respect to the direction of flow of the current in motor operation, is controlled respectively by a third diode and a fourth diode (d3, d4) each series connected with said second winding (E2) and, respectively, said fourth stator winding (E4);

the rotor current (Iro) in the rotor winding (E5) is controlled by a fifth one-way chopper (C) protected by a fifth diode (d5).

According to another preferred embodiment of the electrical traction system according to the invention, the means for switching over from the motor/brake generator operation to the charger operation comprise:

a first contact (c1), which works in closed state in the motor operation mode and in the open state, respectively, in the charger operation mode and is in series with said first chopper (a);

a second contact (c2) which itself also works in the closed state in the motor operation mode and in the open state, respectively, in the charger operation mode and is in series with said third chopper (b);

a third contact (c3) that is mounted on the "center" of the star connection of the stator windings (E1, E2, E3, E4) and works in the closed state in the motor operation mode and hence works in the open state in the charger operation mode;

a fourth contact and a fifth contact (c4, c5) which work respectively in the open state and and in the closed state in motor operation mode and hence respectively in the closed state and the open state in the charger operation mode, and which connect the cathode of the fourth diode (d4) respectively to the input and the output of said first and fourth stator windings (E1, E4).

wherein said contacts (c1 to c5) make it possible to change the connections between the stator windings (E1, E2, E3, E4) and the corresponding electronic components in such a way that when said contacts work in the direction corresponding to the charger operation, they enable, by the opening of the first, second and third contacts (c1, c2, c3), firstly the series connection of said third and fourth stator windings (E3, E4) to each other to constitute the primary winding of a transformer and, secondly, the series connection of said first and second windings (E1, E2) to each other to constitute the secondary winding of said transformer while, by the closing and opening respectively of said fourth and fifth contacts (c4, c5), said first, second, third and fourth diodes (d1, d2, d3, d4) are connected to one another in such a way as to constitute the elements of a rectifier bridge connected to said secondary winding (E1+E2) of the transformer and designed to recharge the main or auxiliary battery, when the electromotive force is greater than the supply voltage;

wherein the charging current of this battery is controlled in the primary winding (E3+E4) of said transformer by sixth and seventh choppers (D, E); and wherein a sixth contact (c6) which works in a closed state in motor operation mode and hence in an open state in the charger operation mode, provides, in conjunction with said second, third and fifth contacts (c2, c3, c5), for the insulation of the primary winding of the transformer from the secondary winding of said transformer, and hence insulates the mains supply from the battery (Vp).

According to an advantageous arrangement of this embodiment, at least one of said fifth and sixth choppers (D, E) is constituted, in the charger operation, by one of said second and fourth choppers (A, B) used in the motor/brake generator operation mode.

According to another preferred arrangement of this other embodiment, the stator of the self-synchronous machine comprises fifth, sixth, seventh and eighth additional stator windings (e1, e2, e3, e4) connected in series to each other and respectively coupled to said first, second, third and fourth main stator windings (E1, E2, E3, E4) so that, irrespectively of the working condition of said contacts (c1 to c6), i.e. irrespectively of the operation at the outset, whether in motor/brake generator operation mode or in charger operation mode, said additional stator windings (e1, e2, e3, e4) constitute the secondary winding of a transformer which enables the conversion, after rectification by sixth and seventh diodes (d6, d7) and control by a charging regulator (Rch), of the high-voltage direct current of the main or auxiliary battery (Vp) into a low-voltage direct current designed for the supply and recharging of a conventional power-supply battery (Vs).

According to another arrangement in conformity with the invention, the rotor comprises an additional rotor winding (E6) which is connected between said ring (B1) and first half-ring (B2) and uses the presence in the rotor of the stator current (Ist) to thus increase the ampere-turns of the main rotor winding (E5), the protection of said second and fourth choppers being done by a sixth diode (d6), known as a "free wheel" diode, parallel connected with said additional rotor winding (m6).

The following is a detailed description of the basic operation in motor mode and in brake generator mode as well as the auxiliary operations in charger mode and in converter mod. At the same time, this description takes account of conditions specific to the direction of operation, to the control of the speed and of the torque and to the choppers. Furthermore, a description is given of compounding which is capable of being used in the context of the present invention. In this description, the case taken, by way of an example, is that of an self-synchronous electrical traction machine with four stator windings and two poles, with coiled rotor.

BRIEF DESCRIPTION OF THE DRAWINGS

FIG. 1b shows the relative orientation of the stator windings of the motor shown in FIG. 1a;

FIG. 3b shows a traction system according to the invention similar to that of FIG. 2b but with in addition, the elements that enable the performance of the converter function described in FIG. 3a;

FIG. 4 shows a graph as a function of time illustrating the sequential actuating of the choppers a,b,A,B show in FIG. 1a;

FIG. 5a shows choppers a,b of the motor shown in FIG. 1a;

FIG. 5b shows choppers A,B of the motor shown in FIG. 1a;

FIG. 7 shows a variant of the motor of FIG. 1a.

DESCRIPTION OF THE PREFERRED EMBODIMENTS

I. DESCRIPTION OF OPERATION IN MOTOR MODE

Figure 1A:
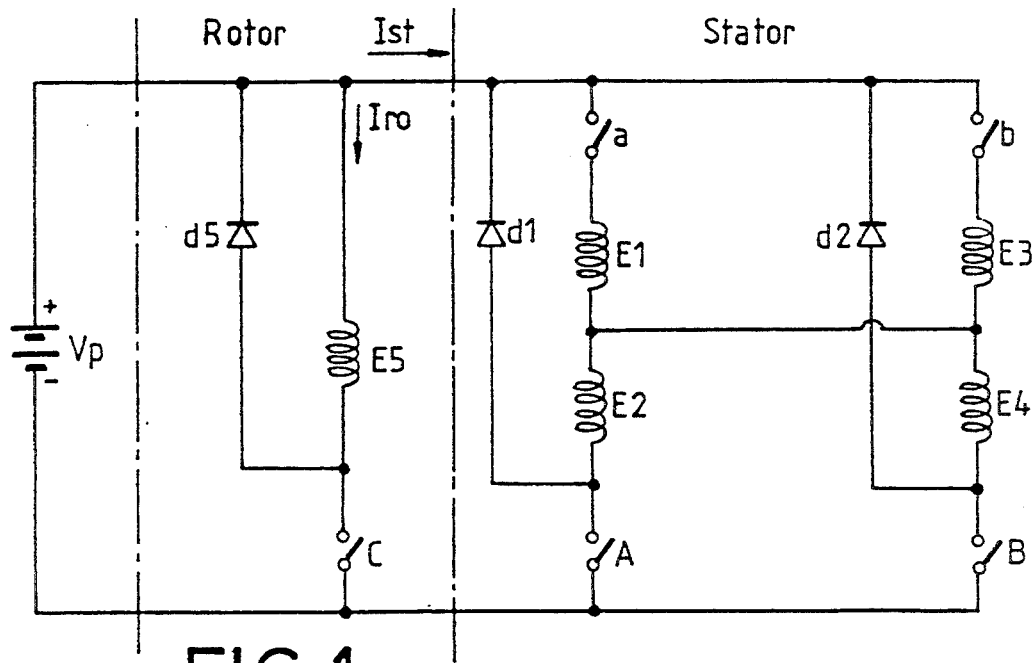
FIG. 1a shows an electrical circuit of an electrical traction system according to the invention, with the system in motor mode.
Figure 1B:
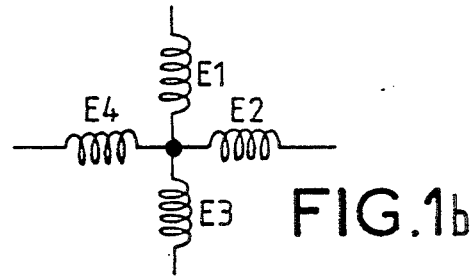

The four stator windings E1, E2, E3, E4 of the drawing of FIG. 1a are star-connected, E1 and E3, E2 and E4 are offset with respect to one another by 180 electrical degrees while the windings E1 and E2 (and hence E3 and E4) are offset with respect to one another by 90 electrical degrees (see FIG. 1b).

A first terminal of a supply source Vp is connected to a first pair of choppers a,b and the second terminal to a second pair of choppers A,B.

The two pairs of choppers a, b and A, B enable the stator current Ist to be routed or shunted respectively into the windings E1+E2, E3+E2, E3+E4, E1+E4, thus creating a rotating field.

In addition to the shunting of the stator current needed for the creation of the rotating stator field, the choppers A and B provide for a control of its value (by an appropriate modulation as shall be specified hereinafter).

The diodes d1 and d2, known as "free wheel" diodes, protect the choppers A and B in sustaining the passage of current in the windings until the natural extinction of this current in these windings.

A rotor winding E5 is connected to the terminals of the supply source Vp, through the chopper C. A freewheel diode d5 is mounted in parallel with the rotor winding E5.

The current Iro of the rotor winding E5, controlled by the chopper C and protected by the "free wheel" diode d5, ensures the creation of the rotor field.

The electronic control of these fields is such that they are kept in quadrature by means of sensors of the angular position of the rotor, thus giving a maximum value of torque:

The windings E1+E2, E2+E3, E3+E4, E4+E1 are the site of alternating electromotive forces, the amplitude of which (during the operation in motor mode which is the object of the present invention) is lower than the supply voltage of the battery Vp.

II. DESCRIPTION OF THE OPERATION IN BRAKE GENERATOR MODE

Figure 1C:
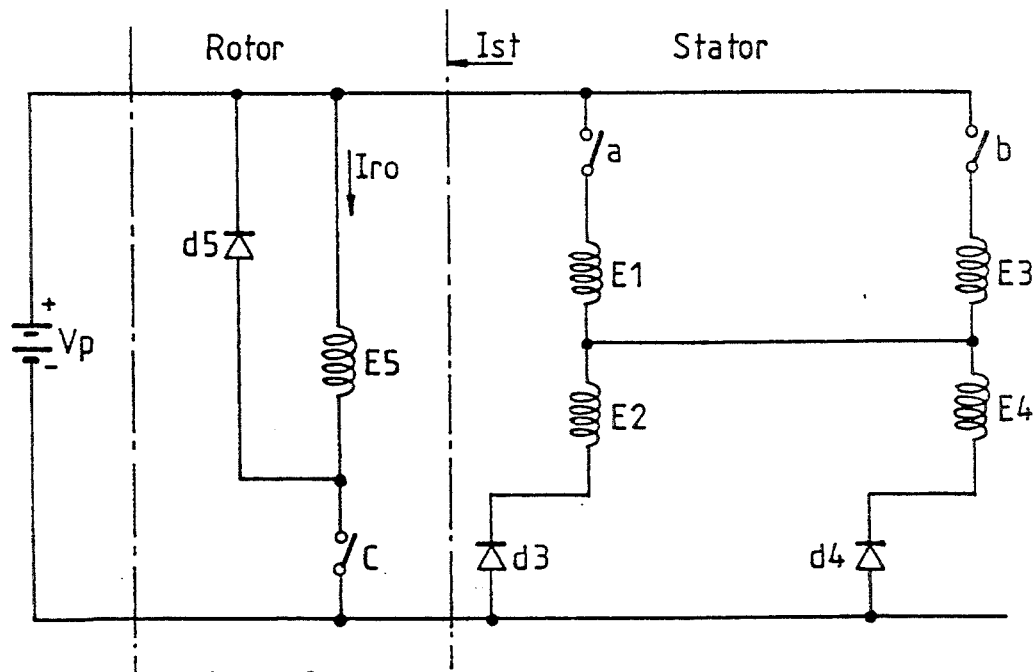
FIG. 1c shows an electrical circuit of the electrical traction system with the motor in brake generator mode.

Of course, in this mode of operation (FIG. 1c), it is assumed that the machine rotates.

An increase in the rotor current Iro (of course, in the non-saturated operating zone of the machine) controlled by the chopper C is expressed by an increase of the electromotive forces in the windings E1+E2, E2+E3, E3+E4, E4+E1 which, becoming greater than the voltage of the battery Vp, enable (through the diodes d3 and d4) the passage of a stator current Ist with a sense opposite that of the operation in motor mode. In this direction, there is truly generation of current and a charging of the battery Vp.

The control of this charging current is done by the control of the rotor current Iro, as indicated here above.

The superimposing of the diagrams 1a and 1c provides for the double operation in motor and in generator modes.

III. DESCRIPTION OF THE OPERATION IN CHARGING MODE

Figure 2A:
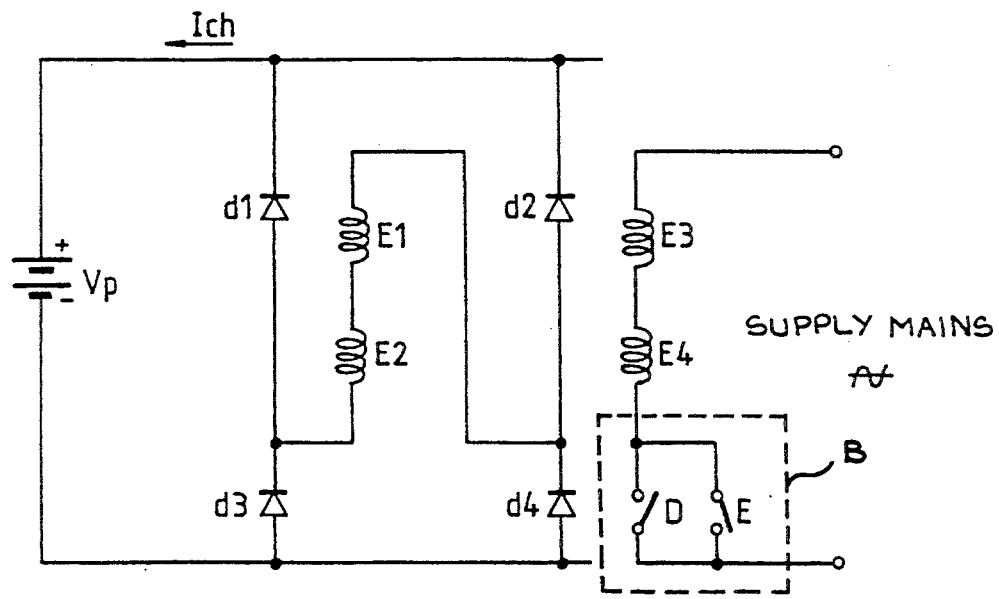
FIG. 2a shows the circuit elements that fulfill a charger function of the motor of the electrical traction system according to the invention.
Figure 2B:
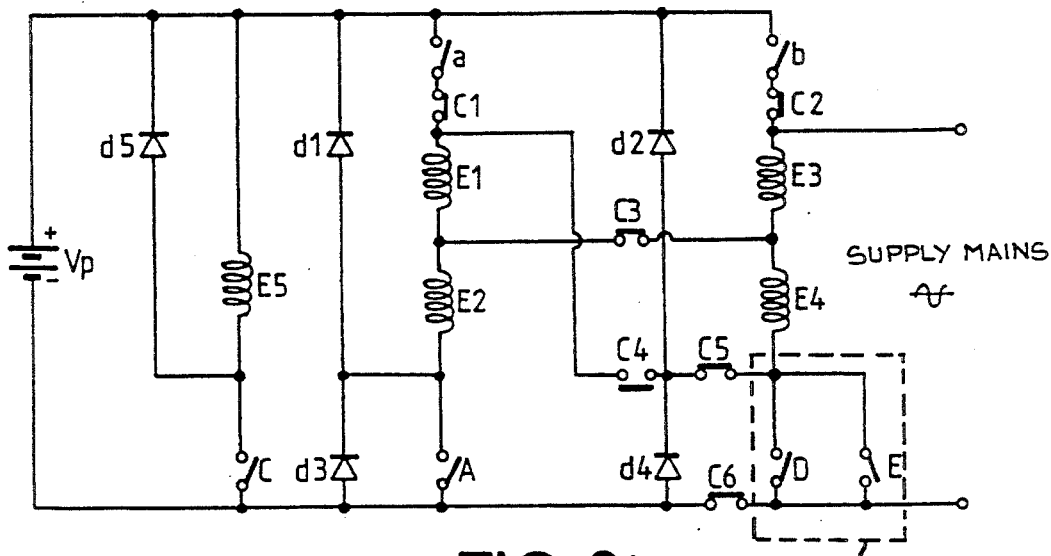
FIG. 2b shows a traction system according to the invention with all the circuit elements that fulfill the motor, brake-generator and charger functions described in the foregoing figures.

In the diagram shown in FIG. 2a, it is assumed that the connections of the different components are reconfigured and that the rotor winding (which has not been shown) has been disconnected. The schematic diagram of FIG. 2b illustrates an exemplary embodiment of switching over for the change from operation in motor or brake generator mode to operation in charger mode. In this FIG. 2b, the contacts shown C1 to c6 correspond to their position in motor operation mode, with the mains connector (to the right in the figure) not having been connected while in the reverse position, these contacts correspond to the charging function (the mains connector being connected in this case).

The windings E1+E2 and E3+E4, which respectively constitute the secondary and the primary windings of a transformer, are shown again.

The diodes d1, d2, d3, d4 constitute the elements of a rectifier bridge connected to the secondary winding E1 and E2 and capable of charging the battery Vp, if the electromotive force is greater than the supply voltage.

The charging current is controlled at the primary winding E3+E4 by the two choppers D and E which may or may not be constituted by the choppers A and B of FIG. 1, the re-utilization of these choppers being preferred in the context of the present invention.

IV. DESCRIPTION OF OPERATION IN CONVERTER MODE

Figure 3A:
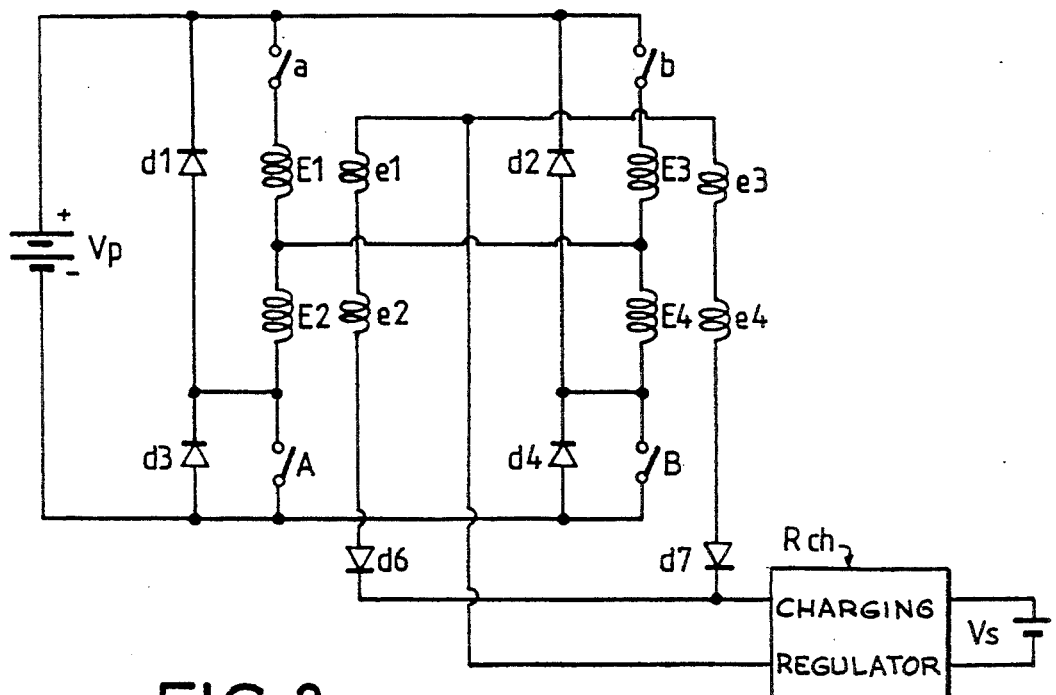
FIG. 3a shows the circuit elements that fulfill a converter function.
Figure 3B:
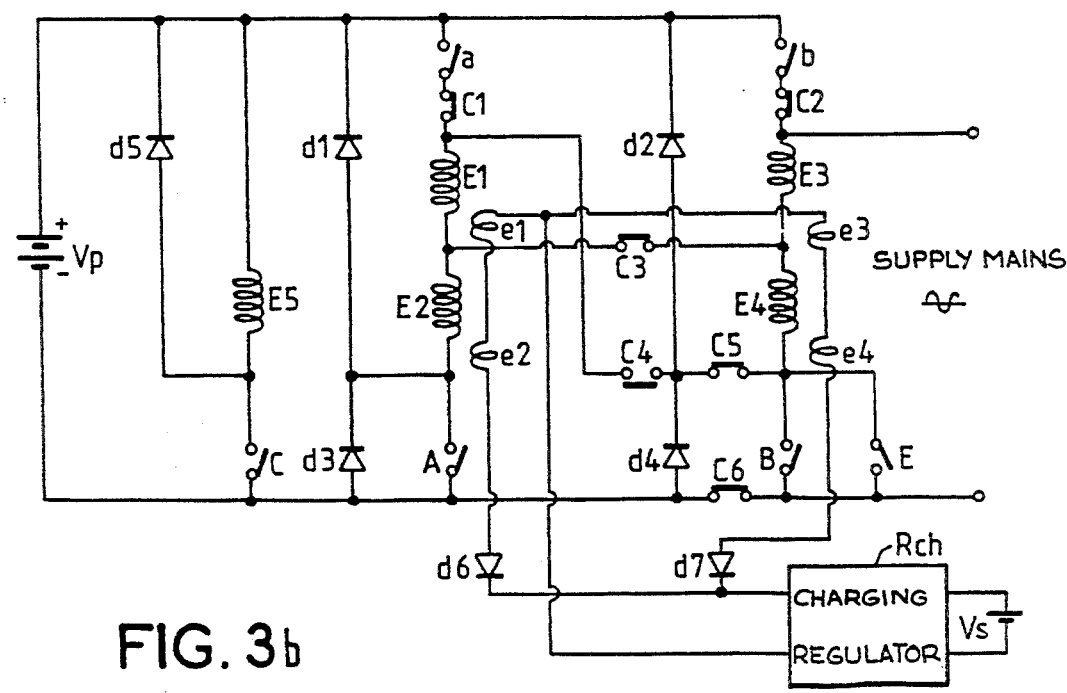

If, in the diagram of the operation in motor/generator mode, there are placed four windings e1, e2, e3, e4, respectively coupled to the windings E1, E2, E3, E4 as shown in the diagram illustrated in FIGS. 3a and 3b these windings constitute the secondary winding with the midpoint of a transformer which, if they are properly sized according to the standards of workmanship known to those skilled in the art, may (after rectifying by the diodes d6, d7 and control by a charging regulator $R_{ch}$) constitute the low-voltage converter parallel-connected with the standard power-supply battery Vs (normally 6 or 12 V). The schematic diagram of FIG. 3b illustrates an exemplary embodiment of the switching for the change from the motor/brake generator operation mode or charger operation mode to the converter operation mode. In this FIG. 3b, the contacts c1 to c6 are shown in the position corresponding to the motor/brake generator mode of operation (as in FIG. 2b). However, it is clear that the converter mode of operation may also be obtained from the same contacts c1 to c6 in the position corresponding to the charger mode of operation. This amounts to saying that the converter mode of operation can be obtained either with the self-synchronous machine turned on or with this machine turned off.

V. CONTROL OF THE DIRECTION OF OPERATION

To reverse the operating direction of the motor, it is enough to reverse the phase of the choppers A and B.

Figure 4:
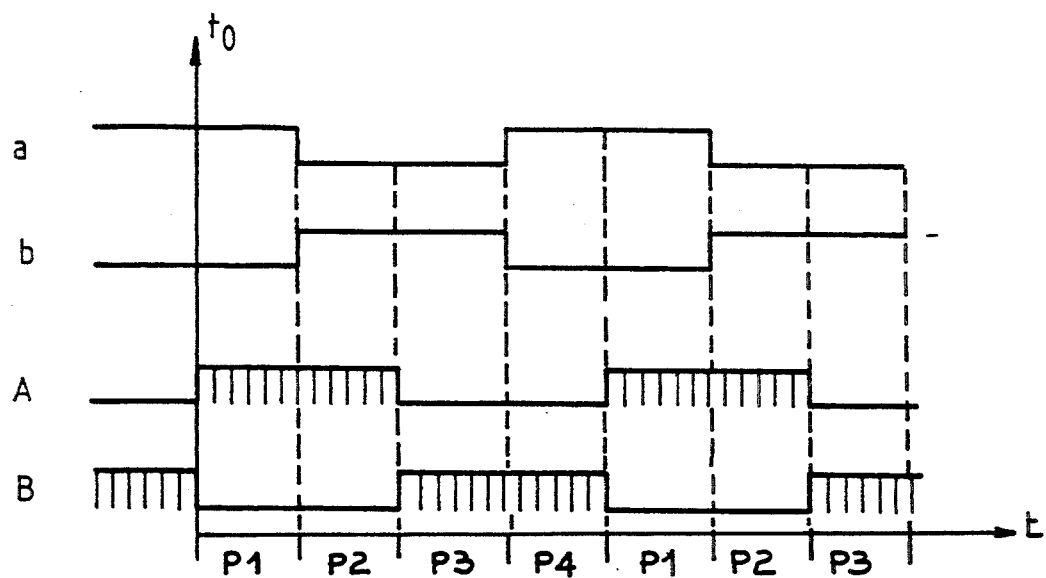

In the case of FIG. 4, we successively have the excitation of the windings E1+E2, E3+E2, E3+E4, E1+E4. The reversal of the phases of the choppers B and A would lead to the following sequencing: E1+E4, E3+E4, E3+E2, E1+E2, thus showing the reversal of the direction of rotation.

VI. CONTROL OF THE SPEED AND OF THE TORQUE

The control of the speed and of the torque is done by means of dual action on the rotor and stator currents.

This dual action (if it is perfectly controlled by means of digital control by a processor in real time, with maximum efficiency) enables the covering of the entire range of torque/speed operation of the traction motor in the different uses to which it is put.

VII. OPERATION OF THE CHOPPERS

Figure 5A:
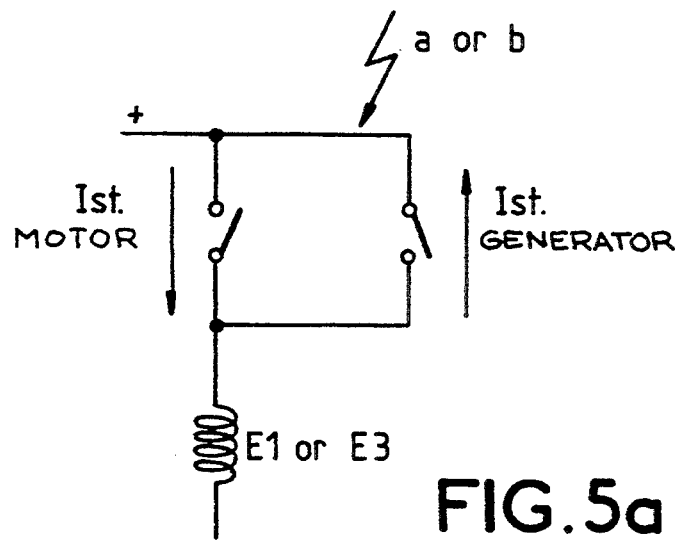

The choppers a and b in motor and generator operation are two-way switches (FIG. 5a). These switches (open or closed) may be electronic (bipolar transistor, MOSFET, IGBT, thyristor etc) or mechanical. They are actuated automatically by the detection of the angular position of the rotor (by the sensor or mechanical structure respectively).

Figure 5B:
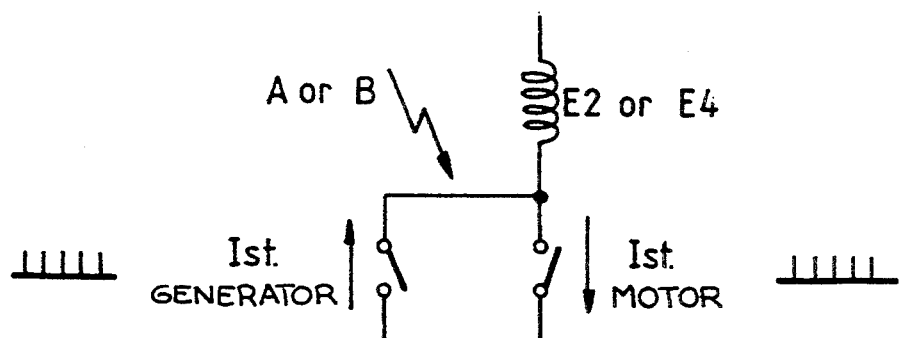

The choppers A and B too, in motor and generator operation mode, are two-way switches (FIG. 5b).

These switches are electronic and, in addition to the shunting of the stator current in the windings E2 and E4, they provide for the control of the value of this current as a function of the angular position of the rotor and as a function of the desired torque (this control can be done for all the possible types of modulation, including the PWM modulation). More specifically, given that the control of the stator currents is a function of the angular position of the rotor, this position is detected by means of angular position sensors so as to enable, after processing in a processor, the control of the choppers in switching and modulation to optimize the operation and the efficiency of the motor and of the brake generator.

Figure 5C:
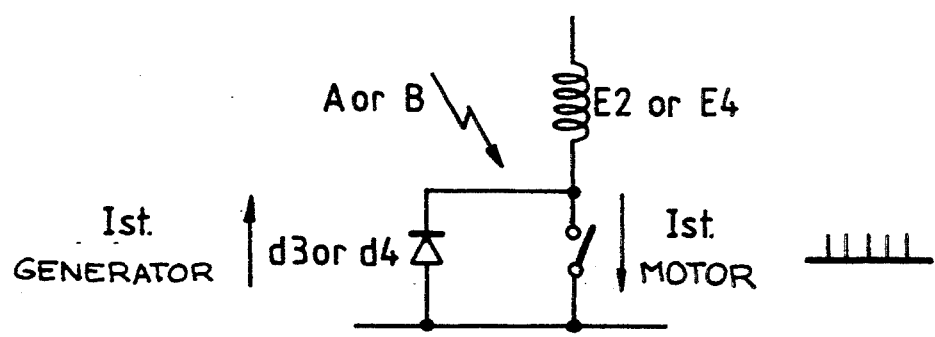
FIG. 5c shows a diode mounted in parallel with choppers A,B of motor shown in FIG. 1c and used in brake generator mode.

A variant (FIG. 5c) uses a diode for the chopper operation in generator mode, the control of the stator current being done, in this case, by a control of the rotor current.

VIII. MECHANICAL CHOPPERS a, b

The shunting of the stator current can be done by means of rings and brushes. FIG. 6 shows two exemplary embodiments.

FIG. 6a

Figure 6A:
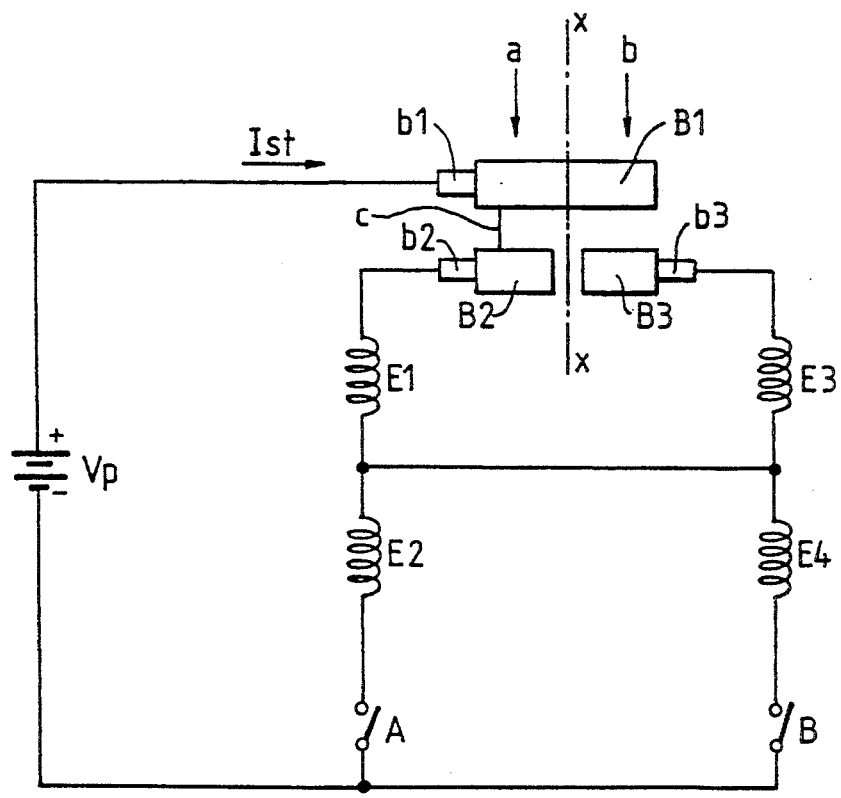
FIGS. 6a,6b show two particular embodiments of mechanical choppers a,b.

In FIG. 6a, the stator current passes from the fixed brush b1, by sliding contact, to a rotating ring B1 which is connected (connection c) to a half-ring B2 that is fixedly joined, like B1, to the rotor; then by the fixed brush b2, the stator current supplies the winding E1 (the half-ring B3 is insulated from the half-ring B2 and the ring B1).

After a half-turn rotation, the half-ring B2 supplies the winding E3 by means of the fixed brush b3.

The electronic control of the current by the choppers A and B may be such that the currents cut off by the brushes are low, or even zero, to limit the wear and tear thereof.

Figure 6B:
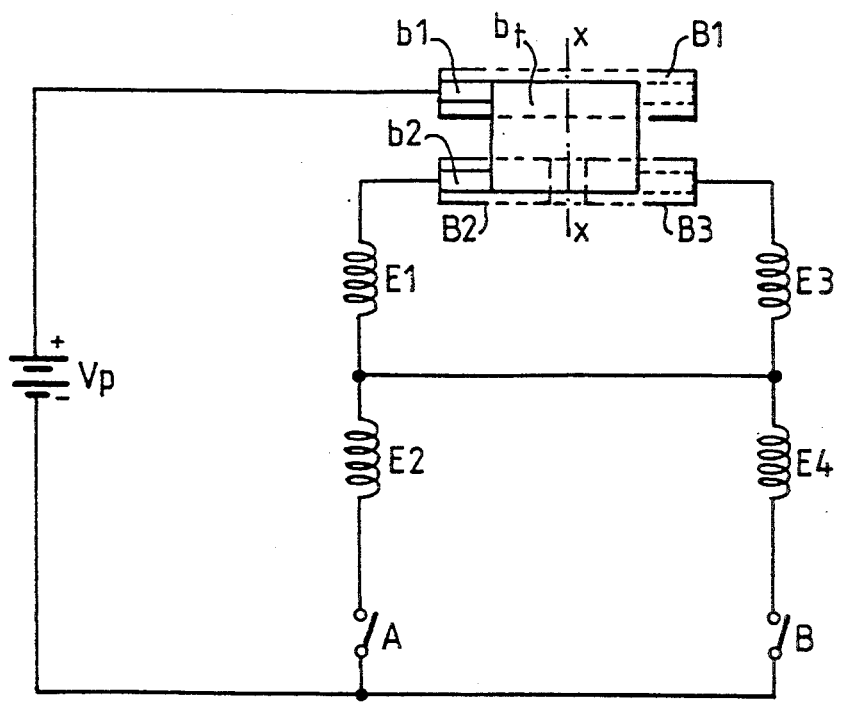

Variant FIG. 6b

In this variant, a rotating double brush bt ensures the circuit connection successively, during its rotation, of the fixed ring B1 and the fixed ring B2 thus supplying the winding E1, then a half-turn later it short-circuits the fixed ring B1 and the fixed half-ring B3, thus supplying the winding E3.

IX. COMPOUNDING

Figure 7:
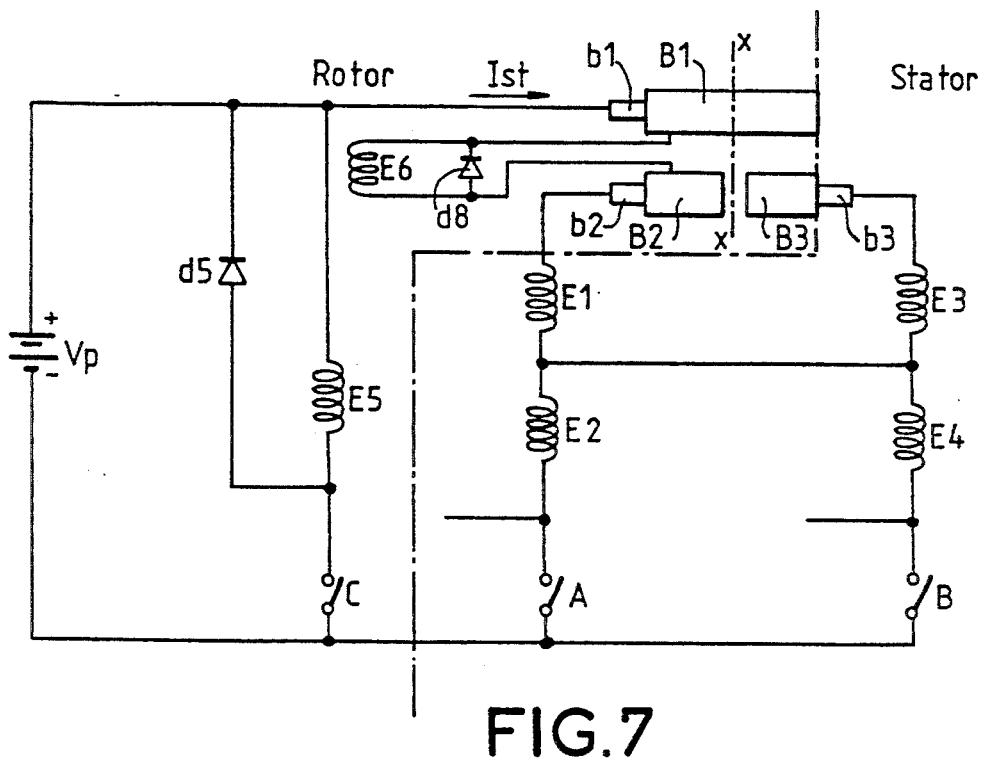

FIG. 7 represents a possible version of the compounding.

The presence, at the rotor, of the stator current enables its use in a complementary excitation winding E6 which increases the ampere-turns of the excitation winding of the winding E5. The complimentary winding E6 is connected between ring B1 and the first half of winding B2 of FIG. 6a. The complimentary winding E6 is magnetically coupled to the rotor winding E5. The diode d8 is in parallel with the winding E6. This possibility provides the machine with torque/speed and efficiency characteristics that are promising in terms of speed and energy saving.

The "free wheel" diode d8 provides for the protection of the choppers A and B and facilitates operation in generator mode.

What is claimed is:

1. An electrical traction system notably for automobiles comprising:
   at least one rechargeable supply source,
   at least one synchronous electrical motor comprising:
   a stator with a plurality of spatially offset windings,
   a commutating device with choppers for routing a current given by the rechargeable supply source into said stator windings in order to create a rotating magnetic field when the motor is energized.
   means for reconfiguring said stator into a transformer in order to recharge the rechargeable supply source from mains supply when the motor is not energized.

2. An electrical traction system according to claim 1 wherein the stator comprises four windings star-connected, the commutating device comprises four choppers each connected in series with a slator winding, said stator windings associated with said choppers being disposed in two groups, in a group the stator windings being offset by 180 electrical degrees, said choppers being controlled sequentially two by two to enable the routing of the current in the stator windings, a chopper of a first group being controlled simultaneously with a first chopper of the second group then with a second chopper of the second group, the choppers of the first group being also controlled in modulation to set the value of the current in the stator.

3. An electrical traction system according to claim 2 wherein the choppers of the first group are semi conductors.

4. An electrical traction system according to claim 2 wherein the choppers of the second group are semiconductors controlled by sensing the position of the rotor with respect to the stator.

5. An electrical traction system according to claim 2 wherein the choppers of the second group are mechanical and comprise a ring, a first half-ring and a second half-ring, the first half-ring being electrically connected to the ring, the second half-ring being electrically insulated from the ring and from the first half-ring.

6. An electrical traction system according to claim 5 wherein said ring and said half-rings rotate with the rotor and wherein a first fixed brush connected to a terminal of the rechargeable supply source slides on the ring and two fixed brushes, each connected to a stator winding or the second group, slide on the half-ring.

7. An electrical traction system according to claim 5 wherein said ring and said half-rings are fixed, said ring being connected to a terminal of the rechargeable supply source, each half-ring being connected to a stator winding of the second group and wherein a double brush rotates with the rotor within said ring and half-rings.

8. An electrical traction system according to claim 5 with a rotor having at least one winding, wherein said motor comprises a compoundary circuit forming by a complementary excitation winding connected in series with a stator winding.

9. An electrical traction system according to claim 2 wherein each chopper of the first group is protected by a free-wheel diode;

10. An electrical traction system according to claim 2 wherein the motor in order to work as a brake generator comprises a diode mounted in parallel which each chopper or the first group, letting the current pass into the stator winding in a direction aimed at charging the power supply.

11. An electrical traction system according to claim 2 wherein the rotor comprises a rotor winding, said rotor winding being series connected with a fifth chopper for controlling a current given by the supply source in the rotor winding, said chopper being protected by a free-wheel diode.

12. An electrical traction system according to claim 2 wherein said contacts connect in series a first stator winding of the first group with a first stator winding of the second group, said first windings forming the primary of the transformer and being connected to the mains supply, and connect in series a second stator winding of the first group with a second stator winding of the second group, said second windings forming the secondary of the transformer, the free-wheel diodes of the choppers of the first group and the diodes mounted in parallel with the choppers of the first group forming a rectifier bridge connected to the secondary of the transformer and to the rechargeable supply source.

13. An electrical traction system according to claim 2, wherein the system comprises a converter for recharging an auxiliary battery, said converter comprises auxiliary windings coupled to the stator windings, means for rectification connected to the auxiliary windings and a charging regulator connected between the means for rectification and the auxiliary battery.

* * * * *